Jan. 31, 1961 G. B. HAHN 2,969,992
SPRING SUSPENSION FOR BICYCLE WHEEL
Filed May 18, 1959 2 Sheets-Sheet 1

INVENTOR
GILBERT B. HAHN

BY Williams, Tilberry & Gilbrick
ATTORNEYS

Jan. 31, 1961 G. B. HAHN 2,969,992
SPRING SUSPENSION FOR BICYCLE WHEEL
Filed May 18, 1959 2 Sheets-Sheet 2
FIG. 3
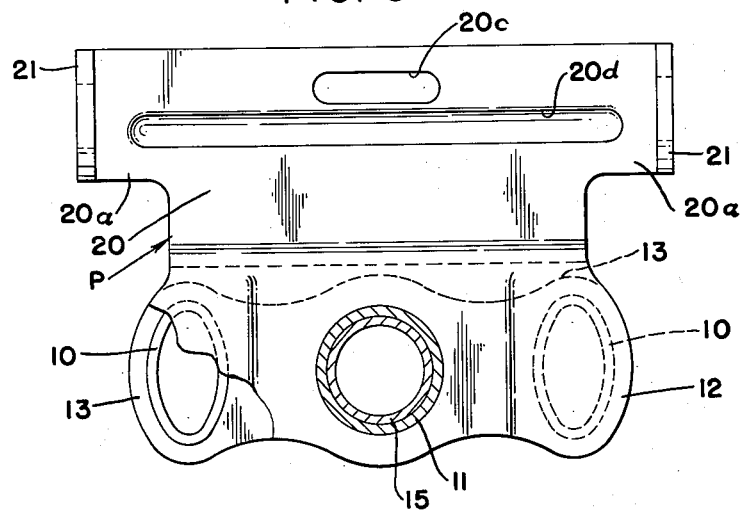
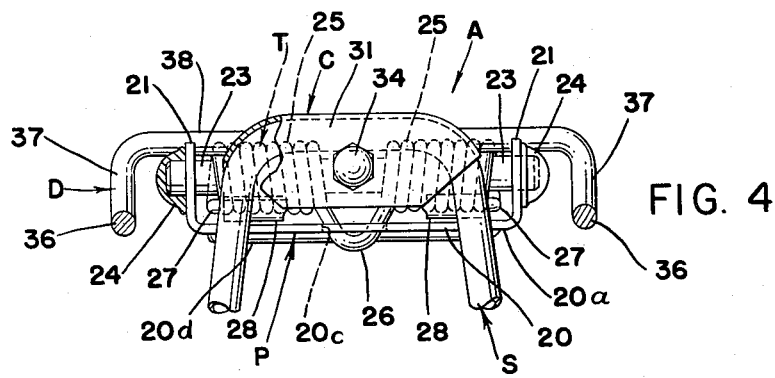
FIG. 4
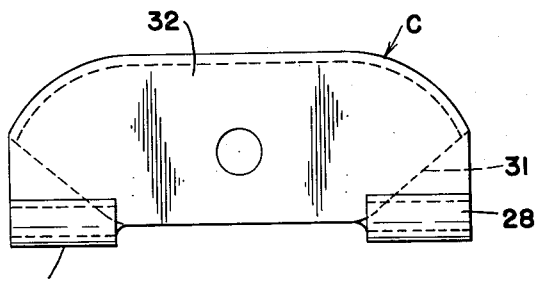
FIG. 5
INVENTOR
GILBERT B. HAHN
BY Williams, Tilberry & Golrick
ATTORNEYS

United States Patent Office 2,969,992
Patented Jan. 31, 1961

2,969,992

SPRING SUSPENSION FOR BICYCLE WHEEL

Gilbert B. Hahn, Nashville, Tenn., assignor to The Murray Ohio Manufacturing Company, Nashville, Tenn., a corporation of Ohio Filed May 18, 1959, Ser. No. 813,718

7 Claims. (Cl. 280—277)

The present invention relates to a suspension or mount for a wheel of a vehicle such as a bicycle or the like; and more especially to a spring suspension for a wheel of the character described. Specifically, the disclosed embodiment of this invention is concerned with a torsion spring type suspension for the front or steering wheel of a bicycle.

Spring type wheel suspensions for vehicles such as bicycles are well known in various forms to the prior art. The Kraeft U.S. Patent 2,537,679 for example, may be noted as disclosing a particular known form, approaching the general character of, and improved by, this invention. The structure of the aforementioned patent comprises as primary components a front or steering wheel fork between the tines or prongs of which the wheel is mounted; a pair of generally parallel lever or link members each pivoted on the lower end of a corresponding fork prong to which members respectively the opposite ends of the wheel axle are secured; a lateral strut element pivotally secured to each lever and running upwardly outside the fork prongs to the region above the wheel; and a spring means, anchored at one end to the fork structure and at the other end connected to the strut elements, so that vertical displacement of the wheel relative to the fork works against the spring. This invention embodies the elements of the said patent insofar as they are thus broadly defined or described.

The structure of the prior patent further includes a forwardly projecting spring supporting anchor or platform stamping welded to the fork yoke portion. The spring means, axially stressed during use of the vehicle, namely, a conically or helically wound tension spring or springs is connected to the bottom to the platform and at the top jointly to the upper ends of both strut elements, which are rigidly secured together in that region. Either a single long narrow inverted U-shaped rod provides the strut elements rigidly secured together at their upper ends by the integral yoke of the U, which in turn is connected by a clip to the top of the spring means; or alternatively individual struts are used having top ends rigidly joined by a separate transverse yoke structure, particularly where paired helical springs are used rather than a single conical spring.

In contrast, the structure disclosed herein utilizes a torsionally stressed spring, with the attained object and advantage that the spring mounting, spring, and spring connection between the strut member and platform is simplified and may be reduced in size. Further the platform for the spring, as a distinct advantageous feature, may be incorporated integrally into the fork structure. Moreover, the entire suspension system or assembly is such that a further fender protecting and also decorative strut member may be readily applied to a front wheel fork without interfering with the function of the suspension or its compact neat appearance.

Other objects and advantages will appear from the following description and the drawings, showing one embodiment of the invention wherein:

Fig. 3 is a detail plan view corresponding to Fig. 2;

Fig. 4 is a front fragmentary elevation showing the manner of attachment of the wheel suspension struts and the torsion spring member; and Fig. 5 is a rear elevational detail of a strut clip.

Figure 1:
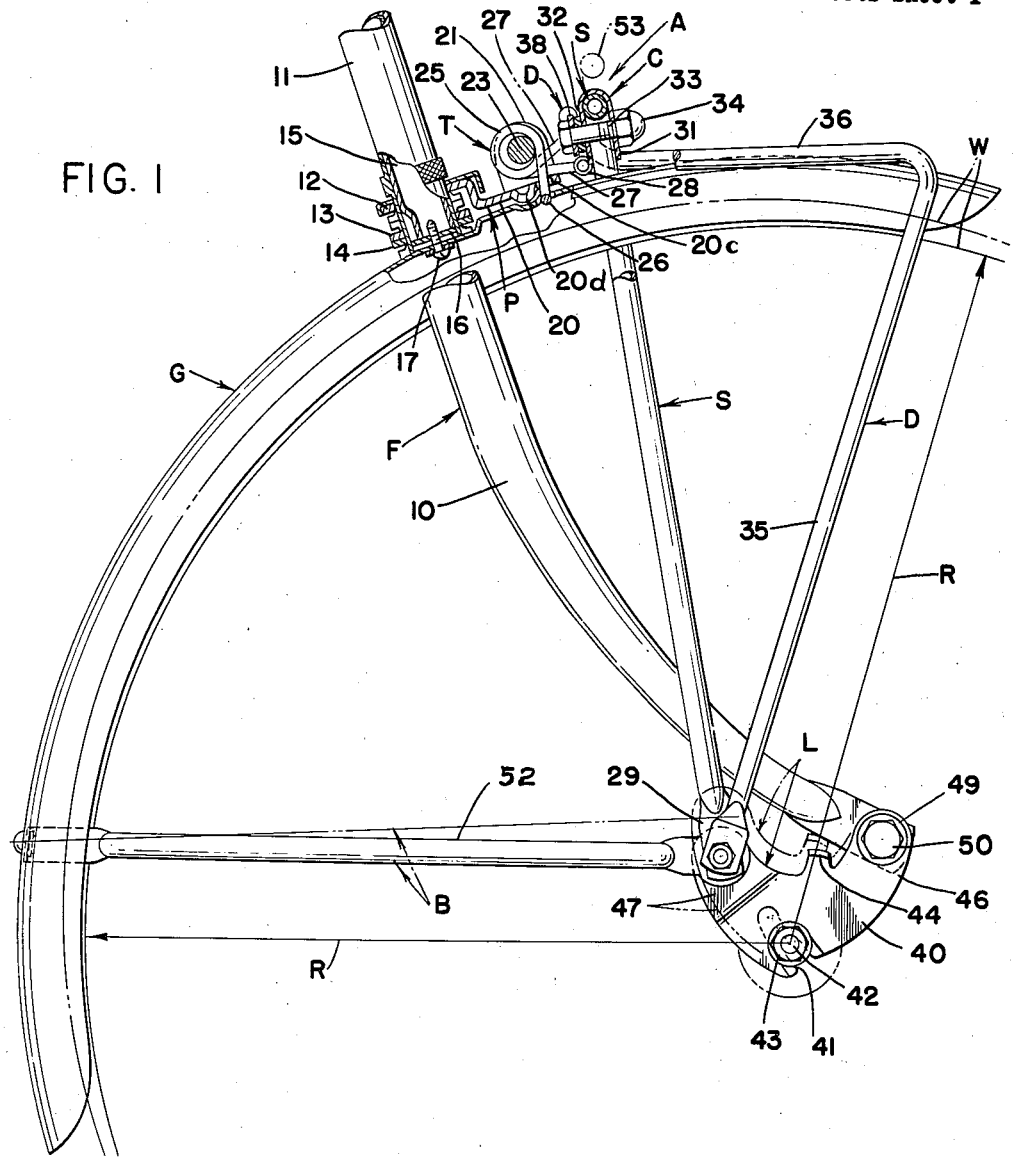
Fig. 1 is a side elevation of a bicycle steering fork and wheel spring suspension assembly, with certain parts broken away and the bicycle wheel itself being indicated only in outline form.

In Fig. 1 of the drawings, there is shown a steering fork and spring suspension for mounting the front wheel of a bicycle, the principal components of which are the front wheel W (indicated only by a solid arcuate line delimiting the perimeter of the tire at bottom-most position); the steering fork F between the prongs 10 of which the wheel is vertically, movably mounted; a pair of parallel link or lever members L pivotally mounted at their front ends to the respective lower ends of the fork prongs, and having the wheel axle 42 secured therebetween; an inverted elongated U-shaped strut member S providing lateral strut elements with lower ends pivotally connected to respective rear ends of lever members L, the upper ends of S being resiliently anchored and guided for vertical movement relative to the fork; a fender or mud guard G secured to the underside of yoke portion of the fork between the prongs thereof; and a generally horizontal U-shaped fender brace B, the connection of the fender and yoke region of the brace being such as to permit limited upward movement of the forward ends of the brace legs with the link members later detailed. The aforegoing structure as thus far described in broad terms is known in the prior art.

Further principal components are the assembly A for resiliently anchoring and guiding strut member S, including a platform member P integrally secured to and projecting forwardly from the yoke region of the fork F, torsion spring means T, and a clip C for connecting the torsion spring to the strut member; and another strut member D or truss rod serving both as protection for the forward end of the fender G and also as a decorative element. In general, it may be here noted that all of the elements in the overall assembly are symmetrically disposed on opposite sides of a longitudinal center plane of the fork, i.e. passing axially through the stem or tang 11 of the fork, the levers L as separate paired elements being, of course, mirror images of each other. Also, the platform member P as here shown is actually relatively heavy sheet steel stamping forming an integral part of the fork assembly.

Figure 2:
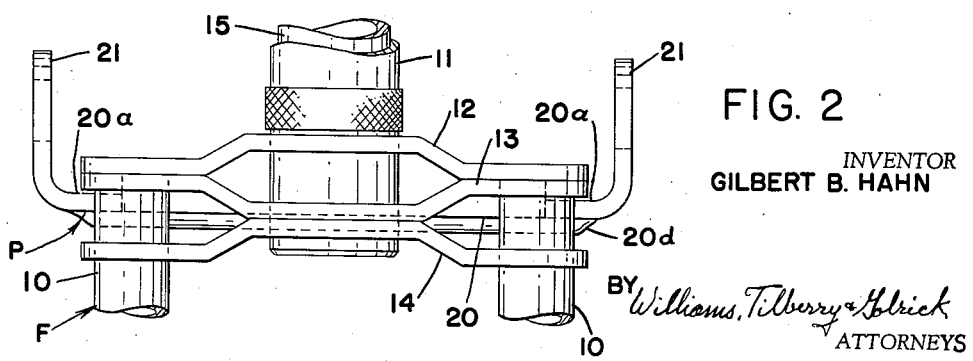
Fig. 2 is a rear fragmentary elevational view of the yoke region of the bicycle steering fork with integrally attached platform element of the spring suspension.

The upper ends of the identical fork prongs 10 are secured in equi-spaced parallel relation to the stem 11 through a fork bridge or yoke structure, best seen in Fig. 2 as comprised of the elevated rear portion 12 of the platform member P, and therebelow the two identical members 13 and 14. Each of the members 13 and 14 is stamped out of heavy sheet steel to have like-apertured coplanar end portions or ears and a parallel offset centrally round-apertured middle portion, and to be symmetrical about a center plane passed through the centers of the central and the two ear apertures. The ear apertures correspond to the external shape of the upper end reaches of the fork prongs, here elliptical, and the central apertures are round to correspond to the lower end of the fork stem or tang 11. The rear portion 12 of the platform is similarly formed with a centrally circularly-apertured offset middle portion and unapertured coplanar ear or end portions.

As shown in the drawings, the middle portions of 13 and 14 are in face-to-face relation, and so also the downwardly offset ears of 12 with the ears of 13, to afford spaced regions of attachment in the fork yoke structure both of the prongs in 13 and 14 and of the stem in 12 and in 13—14. A generally cylindrical tubular insert 15 reinforces the lower end of the tubular stem 11, and a bridge piece or spider 16 is located on the bottom end of 15 as a shoulder in the lower end of the stem. The lower end of the tang or stem is secured in the aligned central apertures 12, 13 and 14; the upper end of each fork prong 10 is secured in the corresponding aligned elliptical ear apertures of members 13 and 14 and in abutting relation with the underside of the member 12; and the elements 15 and 16 are secured to each other and in the outer tube of 11; all preferably by furnace brazing to provide an integral fork. The upper region of the fender or guard G is secured to the bottom portion of the fork yoke by a suitable fastener such as self-tapping screw 17 in a central aperture of the bridge 16.

Beginning shortly below the point of attachment of the prongs to the bridge, the prongs begin to curve forwardly in a downward direction away from parallelism with the axis of the stem 11, whereby the lower ends of the swaged tubular prongs—flattened together and apertured for pivot bolt connection of the links L—are markedly displaced forwardly from the location of the axis of the stem, thereby to secure a required caster effect in the steering wheel.

As previously noted, the platform member P is a heavy metal stamping projecting forwardly from the yoke region of the fork, the overall shape of which may be gathered from Figs. 3, 4, and 1. From the previously described rear portion 12, the stamping is formed downwardly in front of the steering fork yoke to a generally flat portion or platform area 20 extending over the fender, at the forward end of which apertured lateral projections 20a are formed upwardly into parallel vertical aligned apertured lugs or ears 21; a downward transverse reinforcement rib 20d being formed in the forward portion, and a relatively short narrow slot-like perforation 20c being provided between the rib and forward edge of the stamping. For support of the helically wound torsion spring means T, hereinafter described in detail, a rod or shaft 23 is passed lengthwise therethrough to have its opposite ends received in the apertures of the ears 21, the rod being held in position by end caps 24 pressed into place on the rod ends or, if desired, by nuts or other like elements on suitably formed shaft ends. The inside diameter of T is larger than the shaft to provide operating clearance and avoid binding.

The torsion spring means T (see Fig. 4) provides in effect two oppositely wound distinct helical springs 25, the reversal of the winding taking place at mid-length where central terminal turns or tends of the spring portions are carried outwardly as generally coplanar projections joined through a sharp reverse bend, thereby forming a tangentially projecting spring anchoring arm 26 brought downwardly in front of the shaft 23 and inserted in the platform slot 20c to anchor the inner ends of the spring halves against rotation. The outer turns of the respective spring halves 25 are brought out forwardly under the shaft 23 in straight arm portions 27 which are bent horizontally inwardly into alignment for insertion in aligned sockets 28 formed in the spring clip C.

The strut member S is here shown as an elongated U-shaped tubular member, the generally straight yoke or top portion of which merges or curves around into depending divergent coplanar legs having respective bottom ends 29 flattened and apertured for a pivotal connection with the back end of the corresponding link members L. The clip member C (see Fig. 5) is a single sheet metal piece stamped and formed to provide generally parallel flat front and back walls 31 and 32 provided with aligned central apertures for a clamping bolt 33 tightened by clamping nut 34, with suitable interposed washers to clamp the yoke region of S therein. The form of the clip in curving over the top from front into back wall is such as to provide a semi-circumferential contact or engagement with the exterior of the corresponding strut portion of S; and further, in transverse aspect it will be noted that the conformity of the clip is also carried down at opposite sides part way over the end curvature of the strut yoke. At opposite lower ends of the back wall, downward projections of the back wall have been curled upwardly around into a form providing the aforementioned sockets 28 for receiving the end of the spring arms 27.

The decorative and fender guarding truss rod or strut member D, it will be noted from Fig. 1 and also Fig. 4, is a continuous formed rod element flattened at the lower ends for common pivotal securement through the link lever members along with the legs of the fender brace D, the reaches 35 running upwardly and forwardly at each side toward the front end region of the fender, where the rod is bent backwardly in generally horizontal reaches 36, each terminating in a short upward bend 37 at opposite ends of the transverse or yoke portion 38 which runs behind the clip C with a flattened central portion apertured for reception on clamp bolt 33. Hence, the upper end of D is in effect pivotally mounted relative to the platform. The same fender protecting function, as well as decorative effect, may likewise be achieved by simply pivotally securing or mounting a straight transverse portion 38 on the platform at a location not interfering with spring means T, as behind the ears 21; or using separate truss rods each generally shaped with reaches 35, 36 and having a bent end portion 37 terminating in a transversely directed inward pivot at respective cap 34.

As may be seen in Fig. 1, each link or lever member is a generally crescent-shaped stamping having a flat main body portion 40 slotted upwardly and rearwardly at 41 to receive front wheel axle 42 secured at each end by a nut 43 and interposed washer, while a projection 44 on the upper side is bent laterally outwardly to serve as a stop element in encountering the lower portion of the corresponding prong 10. The flat front portion 46, apertured for pivotal connection as hereafter detailed, is parallel offset outwardly to come up outside of the fork prong end; while the apertured flat rear end portion 47 is similarly but more markedly offset to provide proper operating clearance of the strut members S and D relative to the fork tines.

Preferably to give the stronger pivot construction at the front and back of the link, a pivot barrel or bushing 49 (clearly apparent at the front end of the link) is used, projecting outwardly from the offset portion, with a reduced end pressed into the corresponding aperture of the portions 46 or 47 to the full depth or thickness of the plate for reception of the under-head cylindrical pivot portion of a corresponding bolt 50, the reduced threaded portion extending beyond the barrel at 46 through the aperture in the corresponding fork prong for securement by a nut on the inner end of 50. At 47 in the back of each link, the bolt is brought through the barrel from the inside, the head being oversized relative to the reduced end of the bushing to bear against the inner side of the lever L at the offset surface 47; with a washer, the apertured ends of the brace leg 52, of the strut end 29, end of the reach 35 being applied to the threaded outer end of the bolt and secured thereon by the clamping nut.

The positions of the link members L of the brace B and strut S shown in solid lines are the extreme lowermost positions but when the vehicle is traveling over a smooth surface, the parts would be in positions somewhat higher. When any bumps are encountered, the wheel axis moves rearwardly and upwardly in an arcuate path about the link pivot center at the fork bolts. The solid circularly arcuate line designated W, to which the radius lines are run from the axle, indicates the extreme downward position of the wheel; and the dashed arcuate line W indicates the corresponding maximum upward displacement of the wheel, determined as indicated by the dashed outlines of the links, by the stops 44 encountering the side or bottom edge of the fork prongs.

The dashed circle 53 indicates a corresponding extreme upward position of the top or yoke portion of the strut member S. It will be noted that this is displaced only slightly forwardly of the bottommost position shown in solid outline for the condition where the spring arm 27 abuts against the forward edge of the platform as a stop. The spring means T in the manner of its pivotal connection with the clip C thus not only permits a resiliently, upwardly resisted movement of the wheel and the strut but also serves as a guide for the strut, the strut in turn resisting angular deflection of the wheel axle out of perpendicularity to the longitudinal center place of the fork.

By the incorporation of the platform member as an integral part of the fork yoke structure as here disclosed, simplicity and low fabrication cost is attained for an overall fork structure and spring suspension which is quite strong as to the fork per se and as to the attachment of the spring supporting base—included in the forward part of the platform—relative to the fork; and further a compact attachment of clean appearance is provided for the torsion spring mechanism.

I claim:

1. A spring type suspension for a wheel of a bicycle or like vehicle wherein said wheel is disposed parallelly between the two parallel prongs of a wheel mounting fork joined by a yoke above the wheel occupied space, said suspension comprising, in combination with said fork: a pair of generally parallel lever elements pivoted to the lower ends of respective prongs for supporting a wheel axle therebetween, a platform rigidly secured to the yoke region of said fork and projecting outwardly over the wheel, said platform including a pair of spaced apertured upward lugs at respective sides thereof, a pair of aligned oppositely helically wound torsion springs between said lugs, support rod means located in the lug apertures and internally supporting said springs, said springs each having one end fixed against rotation to the platform and the other end rotationally free, a pair of parallel struts with bottom ends pivotally secured to respective said levers and extending upward beyond said platform, said struts having upper ends rigidly joined to form a strut member, and means pivotally securing the free spring ends commonly to said strut member.

2. In a bicycle front wheel suspension and fork combination of the type having the wheel axle mounted between two lever elements pivotally secured to the respective lower ends of the fork prongs, a platform projecting from a yoke region of the fork over the wheel, and an elongated inverted U-shaped strut means having legs depending outside the respective fork prongs, said legs having lower ends pivotally connected to respective ones of the lever elements, the axes of the pivotal connections being in parallel spaced relation to the wheel axle, that improvement comprising: a platform member extending forwardly from and rigidly attached to said yoke region of the fork to provide said platform; said platform member including an upwardly turned apertured ear, shaft means supported by said apertured ear; helical torsion spring means on said shaft means; said torsion spring means including a helically wound spring length with one end engaged against rotation relative to said platform member and a generally tangentially extending opposite end bent into parallel relation to the spring helical axis to form a pivot; and means on the upper end of the strut means providing a journal for the last said pivot.

3. The structure as described in claim 2, wherein the said torsion spring means comprises a spring member having opposite halves reversely wound from respective inner ends continuously joined at a reverse bend engaged with said platform member, and having generally tangentially extending outside ends bent into pivots each parallel to the spring helical axis, said means on the upper end of said strut means providing aligned journals for both the last said pivots.

4. In a bicycle front wheel suspension and fork combination of the type having the wheel axle mounted between two lever elements pivotally secured to the respective lower ends of the fork prongs, a platform projecting from a yoke region of the fork over the wheel, and an elongated inverted U-shaped strut means having depending legs outside the fork prongs on opposite sides of the wheel with lower ends pivotally connected to respective ones of the lever elements, the axes of the pivotal connections being in parallel spaced relation to the wheel axle, that improvement comprising: a platform a stamping member extending forwardly from and rigidly attached to the yoke region of the fork to provide said platform; said platform member including upwardly turned parallel lateral apertured ears near the forward end and a transversely directed slot; shaft means supported in said apertured ears; a helical torsion spring member internally engaged by and supported between said ears on said shaft means; said torsion spring member having opposite halves reversely wound from a projecting arm-like loop engaged in said slot and having tangentially extending opposite ends bent into aligned pivots parallel to the spring helical axis; and a clip member clamped to the upper end of the strut means and having aligned sockets receiving the said aligned pivots.

5. The structure recited in claim 4, including truss rod means for protecting the forward end of a fender mounted between said fork prongs, and comprising as an integral member a top central portion pivotally attached relative to the platform member, generally horizontal reaches running out forwardly from the said central portion along the upper forward part of the fender, and side reaches sloping downwardly and rearwardly back to points of pivotal attachment on respective said link members.

6. In a bicycle front wheel suspension and fork combination of the type having the wheel axle mounted between two lever elements pivotally secured to and extending generally rearwardly from the respective lower ends of the fork prongs, a platform projecting from a yoke region of the fork over the wheel, and an elongated inverted U-shaped strut member having legs depending outside the respective fork prongs, said legs having lower ends pivotally connected to respective ones of the lever elements, the axes of the pivotal connections being in parallel spaced relation to the wheel axle, that improvement comprising: a platform stamping member having a back portion forming an integral part of the fork yoke and projecting forwardly therefrom over the wheel to provide said platform including upwardly turned parallel lateral apertured ears near the forward end thereof and a transversely directed slot; a shaft with opposite ends supported in said apertured ears and means for retaining the shaft in said ears; a helical torsion spring member supported between said ears on said shaft extending lengthwise therethrough; said torsion spring member having opposite halves reversely helically wound from a projecting arm-like loop engaged in said slot, and generally tangentially extending opposite ends bent into aligned pivots parallel to the spring helical axis; a clip member clamped to the upper ends of the strut member and having on the back side thereof aligned sockets receiving the aligned pivots.

7. In a bicycle front wheel suspension and fork combination of the type having the wheel axle mounted between two lever elements pivotally secured to the respective lower ends of the fork prongs, a platform projecting from a yoke region of the fork forwardly over the wheel, and an elongated inverted U-shaped strut means having legs depending outside the respective fork prongs, said legs having lower ends pivotally connected to respective ones of the lever elements, the axes of the pivotal connections being in parallel spaced relation to the wheel axle, that improvements comprising: said fork including a yoke structure rigidly connecting the prong upper ends to each other and to the fork stem lower end into a brazed unitary structure; said yoke being formed of the rear portion of said platform and of two like lower plates each with a centrally apertured middle portion parallelly offset from coplanar apertured opposite end portions, said lower plates having said middle portions in flat face-to-face relation and end portions spaced in aligned relation, the rear portion of said platform having a centrally apertured middle portion upwardly offset in parallel relation from coplanar lateral portions in flat face-to-face relation with corresponding coplanar end portions of an uppermost of said lower plates, the stem lower end being secured in the said central apertures and the upper ends of the prongs in the apertured opposite ends of said lower plates; said platform including upwardly turned apertured ear means near the forward end; shaft means supported by said apertured ear means; helical torsion spring means supported on said shaft means; said torsion spring means including a helically wound length with one end engaged against rotation relative to the platform and a generally tangentially extending opposite end bent into parallel relation to the spring helical axis to form a pivot; and means on the upper end of the strut means providing a journal for the last said pivot.

References Cited in the file of this patent

UNITED STATES PATENTS

| 585,043 | Metz | June 22, 1897 |
| 2,537,679 | Kraeft | Jan. 9, 1951 |
| 2,660,455 | Douglas et al. | Nov. 24, 1953 |

FOREIGN PATENTS

| 590,091 | Germany | Dec. 22, 1933 |
| 40,296 | Netherlands | Mar. 15, 1937 |